US012577343B2

(12) United States Patent
Lin et al.

(10) Patent No.: US 12,577,343 B2
(45) Date of Patent: Mar. 17, 2026

(54) PEPTIDE-IMPRINTED CONDUCTIVE POLYMER AND USE THEREOF

(71) Applicant: National University of Kaohsiung, Kaohsiung (TW)

(72) Inventors: Hung-Yin Lin, Kaohsiung (TW); Mei-Hwa Lee, Kaohsiung (TW); Chien-Hsin Yang, Kaohsiung (TW); Zi-Lin Su, Kaohsiung (TW)

(73) Assignee: National University of Kaohsiung, Kaohsiung (TW)

( * ) Notice: Subject to any disclaimer, the term of this patent is extended or adjusted under 35 U.S.C. 154(b) by 1282 days.

(21) Appl. No.: 17/374,059

(22) Filed: Jul. 13, 2021

(65) Prior Publication Data

US 2022/0356288 A1 Nov. 10, 2022

(30) Foreign Application Priority Data

May 5, 2021 (TW) ................................. 110116292

(51) Int. Cl.
*C08F 283/00* (2006.01)
*C08F 297/00* (2006.01)
*G01N 27/327* (2006.01)

(52) U.S. Cl.
CPC ....... *C08F 283/00* (2013.01); *G01N 27/3275* (2013.01); *C08F 297/00* (2013.01)

(58) Field of Classification Search
CPC .. C08F 283/00; C08F 297/00; G01N 27/3275
See application file for complete search history.

(56) References Cited

U.S. PATENT DOCUMENTS

| 10,723,792 B2 | 7/2020 | Saldanha et al. | |
| 2016/0240322 A1* | 8/2016 | Chien | .................... H01G 9/025 |
| 2018/0095067 A1* | 4/2018 | Huff | ................ G01N 33/48721 |

FOREIGN PATENT DOCUMENTS

| CN | 108409908 A | 8/2018 |
| TW | 201435344 A | 9/2014 |

OTHER PUBLICATIONS

Erdossy, Julia, "Electrosynthesized molecularly imprinted polymers for protein recognition" (2016), Trends in analytical chemistry, 79, pp. 179-190 retrieved from: https://www.sciencedirect.com/science/article/pii/S0956566316305322 (Year: 2016).*

* cited by examiner

*Primary Examiner* — Charles Capozzi
*Assistant Examiner* — Alex Ramirez
(74) *Attorney, Agent, or Firm* — The Webb Law Firm

(57) ABSTRACT

A peptide-imprinted conductive polymer and use thereof is provided, especially a peptide-imprinted conductive polymer including conductive polymer monomer(s), two-dimensional (2D) material(s), and a small peptide fragment of α-synuclein as template. The peptide-imprinted conductive polymer has high sensibility, detects α-synuclein at low concentrations, thus allowing early diagnosis and treatment of Parkinson's disease.

9 Claims, 12 Drawing Sheets

Specification includes a Sequence Listing.

PEPTIDE-IMPRINTED CONDUCTIVE POLYMER AND USE THEREOF

CROSS REFERENCE TO RELATED APPLICATION

This application claims priority to Taiwan Patent Application No. 110116292 filed May 5, 2021, the disclosure of which is hereby incorporated by reference in its entirety.

The Sequence Listing associated with this application is filed in electronic format via EFS-Web and is hereby incorporated by reference into the specification in its entirety. The name of the text file containing the Sequence Listing is 2103456_ST25.txt. The size of the text file is 5,037 bytes, and the text file was created on Jul. 12, 2021.

BACKGROUND OF THE INVENTION

Field of the Invention

This disclosure relates to the combination of epitope imprinting and electrochemical polymerization, especially providing a peptide-imprinted conductive polymer and its use for detecting Parkinson's disease. The peptide-imprinted conductive polymer comprises conductive polymer monomer(s), 2D material(s), and a small peptide fragment of the α-synuclein molecule serving as template. The peptide-imprinted conductive polymer of the present disclosure has high sensitivity and is able to detect α-synuclein at a low concentration, which can be applied in detecting early symptoms of Parkinson's disease.

Description of Related Art

Parkinson's disease is a long-term degenerative disorder of the central nervous system that affects movement and cognitive abilities. The relatively mild symptoms at the onset and slow progression of the disease makes it difficult for even the most experienced neurologists to make an accurate diagnosis at the early stages. It is usually after observing a series of movement abnormalities in the patient that the possibility of Parkinson's disease is considered, while it may have already started as early on as twenty years ago.

α-Synuclein (SNCA) is known to be found in a high amount mainly at the presynaptic terminals of human brain neurons, which regulates dopamine that transmit signals between neurons and is of pivotal importance for the brain to function normally. The α-synuclein in a healthy brain and central nervous system is soluble, whereas for a patient of Parkinson's disease, the α-synuclein misfolds and aggregates into toxic oligomers called Lewy bodies and Lewy neurites, whose aggregation affect the release of neurotransmitters and further lead to injured neurons. As a result, the concentration of α-synuclein in the cerebrospinal fluid of a patient suffering from Parkinson's disease is lower compared to that of a healthy person, which makes it a crucial indicator for detecting the disease.

Existing technology includes measuring the concentration of α-synuclein in the cerebrospinal fluid with α-synuclein antibodies or biochips. Such methods, however, may not be able to measure the correct amount of the subject measured due to limit of detection (LOD), and are costly and time consuming.

Thanks to their relatively high stability, simple operation and low costs, molecular imprinting polymers (MIPs) have been in rapid development in recent years for creating new sensing materials, which are applied in the separation of optically active drugs or cells, or biosensors. Taiwan application No. TW201435344 entitled "A FABRICATION METHOD OF MOLECULARLY IMPRINTED POLYMERIC THIN FILM COATED NANOSTRUCTURE BIOSENSOR FOR THE EXAMINATION OF URINARY BIOMARKERS" is an example of template molecules imprinted into polymers to form the resulting polymers bearing cavities complementary in size and shape to the template for recognizing the analyte, which are then coated onto ceramic nanostructures to obtain the molecularly imprinted polymeric thin film coated nanostructure biosensor for urinalysis.

Protein is the new field in molecule imprinting polymer technique. It has a high molecular weight and exhibits spatial and thermodynamics effect that hinders the formation of selective molecular imprinted cavities. The new imprinting technology developed in response to protein template molecules is called epitope imprinting, wherein only the peptide fragment in the protein molecule is used as template, and imprinted cavities that recognize the whole protein is expected. Selecting suitable length of peptides enhances the sensing sensitivity; the opposite results in a lack of sensibility. The hydrophobic amino acid in the peptide fragment provides the imprinted template molecules with direction in the polymer, produce unitary imprinted cavities, and further gives the cavities high selectivity.

The present disclosure employs the peptide imprinting conductive polymer technology that combines epitope imprinting and electrochemical polymerization to provide a responsive electrodeposition, develop an electrochemical biosensor that measures the concentration of α-synuclein in humans, which could then be applied in the diagnosis of Parkinson's disease.

SUMMARY OF THE INVENTION

α-synuclein is the biomarker for Parkinson's disease. There exist several methods for diagnosing Parkinson's disease by measuring the concentration of α-synuclein in the cerebrospinal fluid, e.g., binding with antibody specificity, surface plasmon resonance-based biosensor, nanopore thin film biosensor, and interdigitated electrode-based biosensor. However, accuracy is limited due to the LOD; the antibody is difficult to preserve and high in costs, and relevant experiments face certain limitations, including expensive analyses conducted by mass spectrometry, or complex and time-consuming methods such as immunoprecipitation and enzyme-linked immunosorbent assay. Errors resulting from human operation are also inevitable.

In view of the problems above, the present disclosure aims to provide a peptide-imprinted conductive polymer that detects α-synuclein in humans, which is not only easy to operate, quick to analyze, low in costs, reusable and highly specific, but is also capable of achieving wide current range, good stability, and high quality of measurement by using electrochemical testing.

To achieve the aims above, the present disclosure provides the following technical means.

In one aspect, the present disclosure provides a peptide-imprinted conductive polymer comprising conductive polymer monomer(s), an α-synuclein identifying template molecule, and two-dimensional (2D) materials.

In some embodiments, the conductive polymer monomer(s) is at least one substance selected from the group consisting of aniline (AN), m-aminobenzenesulfonic acid (MSAN), 3,4-ethylenedioxythiophene (EDOT), and hydroxymethyl 3,4-ethylenedioxy-thiophene (EDOT-OH).

In some embodiments, the concentration of the conductive polymer monomer(s) is 0.001 to 50 wt %.

In some embodiments, the α-synuclein identifying template molecule utilizes a small fragment of α-synuclein as template. As the length of the peptide and the hydrophobic amino acid in the fragment affects the recognition specificity of the imprinted cavities, the template molecule is selected from peptide fragments in SEQ ID NO: 1 fulfilling the following conditions:

i. the peptide fragments are 6 to 22 amino acids in length;
 ii. the peptide fragments contain 1 to 9 hydrophobic amino acids; and
 iii. the peptide fragments contain 1 to 4 aromatic amino acids.

In some embodiments, the concentration of the α-synuclein identifying template molecule is 0.001 to 50 wt %. In some embodiments, the 2D material(s) is at least one substance having the structural formula $M_{n+1}AX_n$ or $MY_2$, wherein M denotes a transition metal element, A denotes an element from group MA or IVA, X denotes carbon or nitrogen, and Y denotes chalcogen element such as S, Se, and Te, n=1-3. Examples include $Cr_2AlC$, $Mn_2AlC$, $Mo_2Ga_2C$, $Mo_3AlC_2$, $Nb_2AlC$, $Nb_2C$, $Nb_4AlC_3$, $Ta_4AlC_3$, $Ti_2AlC$, $Ti_2AlN$, $Ti_2C$, $Ti_3AlC_2$, $Ti_3C_2$, $Ti_3SiC_2$, $V_2AlC$, $V_2C$, $V_4AlC_3$, $MoS_2$, $WS_2$, $TiS_2$, $VS_2$, $CoS_2$, $NiS_2$, $ZrS_2$, $TcS_2$, $RhS_2$, $PdS_2$, $HfS_2$, $TaS_2$, $ReS_2$, $IrS_2$, $InS_2$, $SnS_2$, $S_2PtS_2$, $MoSe_2$, $WSe_2$, $TiSe_2$, $VSe_2$, $CoSe_2$, $NiSe_2$, $ZrSe_2$, $TcSe_2$, $RhSe_2$, $PdSe_2$, $HfSe_2$, $TaSe_2$, $ReSe_2$, $IrSe_2$, $InSe_2$, $SnSe_2$, $Se_2$, $PtSe_2$, $MoTe_2$, $WTe_2$, $TiTe_2$, $VTe_2$, $CoTe_2$, $NiTe_2$, $ZrTe_2$, $TcTe_2$, $RhTe_2$, $PdTe_2$, $HfTe_2$, $TaTe_2$, $ReTe_2$, $IrTe_2$, $InTe_2$, $SnTe_2$, $Te_2$, $PtTe_2$.

In another aspect, the present disclosure provides an electrochemical biosensor comprising the aforementioned peptide-imprinted conductive polymer.

In some embodiments, the electrochemical biosensor comprises an electrode substrate, which may be made from any conductive material understood by a person skilled in the art. Examples include screen-printed electrode, indium tin oxide (ITO) substrate, polyethylene terephthalate (PET) flexible conductive glass substrate, aluminum-doped zinc oxide (AZO) conductive substrate, fluorine-doped tin oxide (FTO) conductive substrate and silicon dioxide conductive substrate. The present disclosure sets no limitation in this regard.

In another aspect, the present disclosure provides a method of preparing the electrochemical biosensor, which comprises:

Step 1: prepare an electrode substrate;
 Step 2: prepare a monomer solution with conductive polymers with a concentration of 0.001 to 50 wt %, wherein the conductive polymer monomer(s) is at least one substance selected from the group consisting of aniline (AN), m-aminobenzenesulfonic acid (MSAN), 3,4-ethylenedioxythiophene (EDOT), and hydroxymethyl 3,4-ethylenedioxy-thiophene (EDOT-OH);
 Step 3: add a template molecule with a concentration of 0.001 to 50 wt % to the monomer solution and mix;
 Step 4: add a 2D material solution, causing the resulting solution to electrochemically polymerize at the electrode substrate.

In another aspect, the present disclosure provides a use of the peptide-imprinted conductive polymer, wherein the peptide-imprinted conductive polymer can be applied in the diagnosis of Parkinson's disease.

The present disclosure provides the α-synuclein peptide formed with amino acids with certain properties as the α-synuclein identifying template molecule. The peptide imprinted cavities have specific recognition for α-synuclein.

The peptide-imprinted conductive polymer of the present disclosure expands the linear region of the calibration line for SNCA to 0.001-100 pg/mL through the addition of 2D materials, significantly improving the response current density value and imprinting efficiency. The peptide-imprinted conductive polymer of the present disclosure therefore exhibits superior sensitivity and a low limit of detection.

By utilizing the changes to the electric properties of the sensors through the specific binding between the sample and polymer, the present disclosure is able to convert the biochemical signals of the samples to electric signals for convenient observation through a transducer, and calculate the concentration of α-synuclein in the sample by quantification of the response current. The data can then be used as a reference for diagnosing the early symptoms of Parkinson's disease.

The present disclosure provides a highly sensitive electrochemical biosensor made with the α-synuclein identifying peptide-imprinted conductive polymer. The circuitry of the biosensor can be micronized, is easy to manufacture, and is low in costs. The electrochemical sensing method is also highly sensitive and has a low limit of detection. The biosensor of the present disclosure is quick in response, easy to operate, low in costs, portable, reusable and has high specificity. A large range of current measurement, good stability and high-quality measurement are also achieved.

DESCRIPTION OF THE INVENTION

Figure 1:
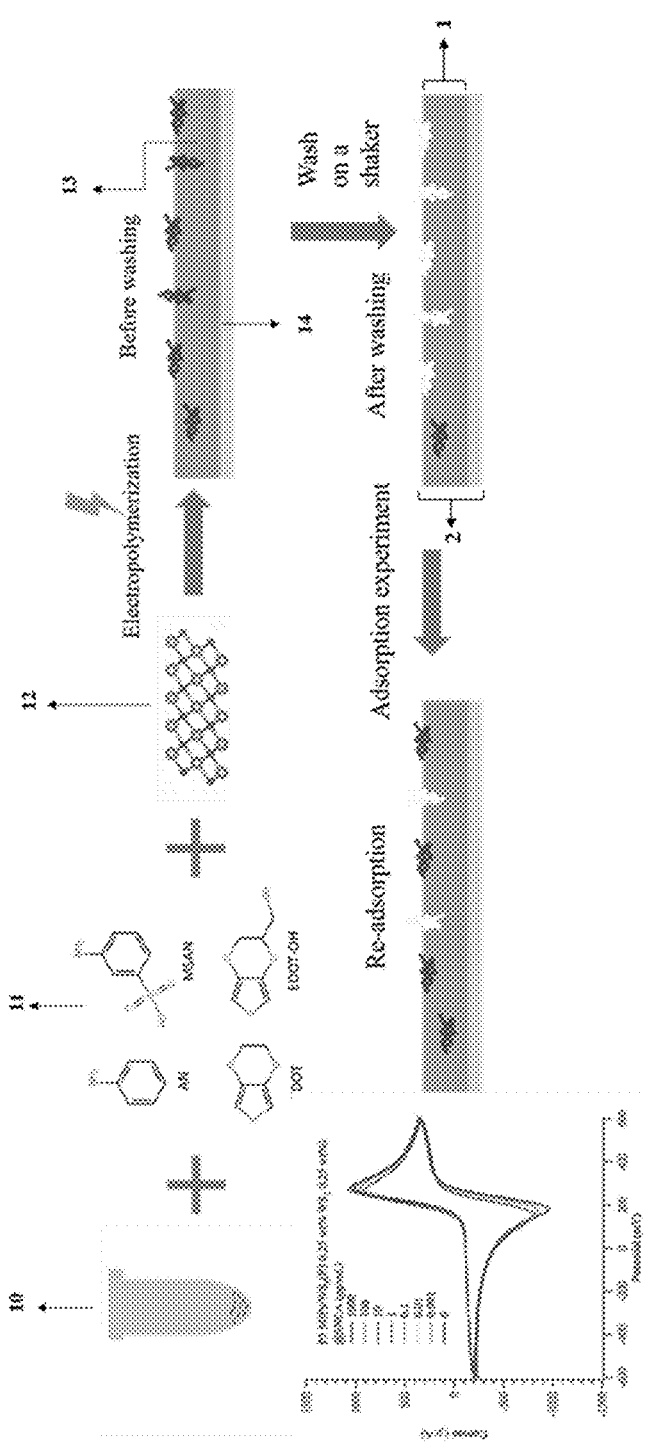
FIG. 1 shows the flowchart of the manufacturing process for the electrochemical biosensor of the α-synuclein peptide-imprinted conductive polymer of the present disclosure.

Detailed description of the present disclosure is disclosed herein. It is only given for illustrative purposes and is not intended to limit the scope of the present disclosure.

The peptide-imprinted conductive polymer of the present disclosure comprises: conductive polymer monomer(s), an α-synuclein identifying template molecule, and two-dimensional (2D) material(s).

The conductive polymer monomer(s) of the present disclosure is at least one substance selected from the group consisting of aniline (AN), m-aminobenzenesulfonic acid (MSAN), 3,4-ethylenedioxythiophene (EDOT), and hydroxymethyl 3,4-ethylenedioxy-thiophene (EDOT-OH).

The concentration of the conductive polymer monomer(s) of the present disclosure is 0.001 to 50 wt %.

Exemplarily, aniline (AN)-doped m-aminobenzenesulfonic acid (MSAN) can be selected as the conductive polymer of the present disclosure, wherein the two are dissolved in DI water respectively, and each has a concentration of 0.001 to 50 wt %, preferably 0.001 to 25 wt %, more preferably 0.001 to 10 wt %.

Preferably, the mole ratio of AN and MSAN is set between 0.001 to 20, preferably 0.25 to 4, more preferably 0.5 to 2, even more preferably 1.

The α-synuclein identifying template molecule of the present disclosure uses a small peptide fragment of the α-synuclein molecule as template. Short peptide is relatively stable and inexpensive compared to protein. However, the length of the peptide affects how easily the molecules can enter and leave the cavities. The hydrophobic nature of the amino acid contained in the peptide fragment has a decisive impact on whether the imprinted cavities formed have recognition specificity, and a proper selection of the peptide enhances the reusability of the imprinted cavities. Therefore, the α-synuclein identifying template molecule of the present disclosure is selected from peptide fragments in SEQ ID NO: 1 fulfilling the following conditions:

i. the peptide fragments are 6 to 22 amino acids in length; preferably, the peptide fragments are 10 to 15 amino acids in length;

ii. the peptide fragments contain 1 to 9 hydrophobic amino acids, wherein the hydrophobic amino acids are selected from the group consisting of: alanine (Ala), phenylalanine (Phe), isoleucine (Ile), leucine (Leu), methionine (Met), proline (Pro), valine (Val), tryptophan (Trp); and iii. the peptide fragments contain 1 to 4 aromatic amino acids, wherein the aromatic amino acids are selected from the group consisting of: phenylalanine (Phe), tryptophan (Trp), tyrosine (Tyr).

To increase the solubility of the template molecule of the present disclosure in the conductive polymer solution, preferably, the peptide fragments contain no more than 6 hydrophobic amino acids; more preferably, the peptide fragments contain no more than 5 hydrophobic amino acids.

Exemplarily, the peptide fragment sequences may be SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13 or SEQ ID NO: 14.

Preferably, the peptide fragment sequences are SEQ ID NO:2, SEQ ID NO: 3 or SEQ ID NO: 4; more preferably, the peptide fragment sequences are SEQ ID NO: 3 or SEQ ID NO: 4.

The concentration of the peptide template molecule is 0.001 to 50 wt %, preferably 0.01 to 25 wt %, more preferably 0.1 to 10 wt %, and even more preferably 0.1 to 0.5 wt %.

The 2D material(s) of the present disclosure is at least one substance selected from the group having the structural formula $M_{n+1}AX_n$ or $MY_2$, wherein the former are transition metal carbides or nitrides (or MXene), and the latter are transition metal dichalcogenides. M denotes a transition metal element, A denotes an element from group IIIA or IVA, X denotes carbon or nitrogen, Y denotes chalcogen element such as S, Se, and Te, and n=1-3. Examples include $Cr_2AlC$, $Mn_2AlC$, $Mo_2Ga_2C$, $Mo_3AlC_2$, $Nb_2AlC$, $Nb_2C$, $Nb_4AlC_3$, $Ta_4AlC_3$, $Ti_2AlC$, $Ti_2AlN$, $Ti_2C$, $Ti_3AlC_2$, $Ti_3C_2$, $Ti_3SiC_2$, $V_2AlC$, $V_2C$, $V_4AlC_3$, $MoS_2$, $WS_2$, $TiS_2$, $VS_2$, $CoS_2$, $NiS_2$, $ZrS_2$, $TcS_2$, $RhS_2$, $PdS_2$, $HfS_2$, $TaS_2$, $ReS_2$, $IrS_2$, $InS_2$, $SnS_2$, $S_2PtS_2$, $MoSe_2$, $WSe_2$, $TiSe_2$, $VSe_2$, $CoSe_2$, $NiSe_2$, $ZrSe_2$, $TcSe_2$, $RhSe_2$, $PdSe_2$, $TaSe_2$, $ReSe_2$, $IrSe_2$, $InSe_2$, $SnSe_2$, $Se_2$, $PtSe_2$, $MoTe_2$, $WTe_2$, $TiTe_2$, $VTe_2$, $CoTe_2$, $NiTe_2$, $ZrTe_2$, $TcTe_2$, $RhTe_2$, $PdTe_2$, $HfTe_2$, $TaTe_2$, $ReTe_2$, $IrTe_2$, $InTe_2$, $SnTe_2$, $Te_2$, $PtTe_2$. The conductivity of transition metal disulfide 2D materials is close to semiconductors, while MXene 2D materials have an excellent conductive nature that is close to metal, good thermostability and mechanical properties, and a particle size that can be 20 times larger.

The concentration of the 2D material(s) is 0.001 to 50 wt %, preferably 0.01 to 25 wt %, more preferably 0.05 to 10 wt %, even more preferably 0.1 to 0.5 wt %, and even further more preferably 0.25 wt %.

Exemplarily, commercial MXene or $MY_2$ 2D materials are added as dopant to the peptide-imprinted conductive polymer solution of the present disclosure to help increase the roughness and surface area of the conductive polymer thin film surface, which increases the overall conductivity and lowers the use of organic solvents in the manufacturing process.

Preferably, the size of the 2D material(s) is 0.05 to 3 μm; more preferably, the size of the 2D material(s) is 0.09 to 2.5 μm; even more preferably, the size of the 2D material(s) is 1 to 2 μm.

The present disclosure provides an electrochemical biosensor made with the peptide-imprinted conductive polymer.

The electrochemical biosensor of the present disclosure further comprises an electrode substrate, which may be made from any conductive material understood by a person skilled in the art. Examples include screen-printed electrode, indium tin oxide (ITO) substrate, PET flexible conductive glass substrate, AZO conductive substrate, FTO conductive substrate and silicon dioxide conductive substrate. The present disclosure sets no limitation in this regard.

As shown in FIG. 1, the method of preparing the electrochemical biosensor made with the α-synuclein peptide-imprinted conductive polymer comprises:

Step 1: prepare an electrode substrate 14;

Step 2: prepare a monomer solution with conductive polymers 11 with a concentration of 0.001 to 50 wt %, wherein the conductive polymer monomer(s) is at least one substance selected from the group consisting of aniline (AN), m-aminobenzenesulfonic acid (MSAN), 3,4-ethylenedioxythiophene (EDOT), and hydroxymethyl 3,4-ethylenedioxy-thiophene EDOT-OH);

Step 3: add an α-synuclein identifying template molecule with a concentration of 0.001 to 50 wt % to the monomer solution and mix;

Step 4: add a 2D material 12 solution, add it to an electropolymerization pool and mix with a magnate, add an auxiliary electrode and a reference electrode, connect to the electrode substrate as working electrode, and connect to a commercial potentiostat to start the electropolymerization process;

Step 5: The finished peptide-imprinted thin film 13 is immersed in 0.05 M ethanol solution and DI water and placed on a shaker at 130 rpm for 5 minutes each. The procedure is used to remove the template molecule bound to the conductive polymer and leaves imprinted cavities with identifying ability, and completes the formation of the peptide-imprinted conductive polymer 1 and electrochemical biosensor 2 of the present application.

The peptide-imprinted conductive polymer of the present disclosure has high sensitivity and a low limit of detection, which can detect α-synuclein in humans at low concentrations, and can be applied in the diagnosis of Parkinson's disease.

Examples of the present disclosure are provided below, but are not intended to limit the present disclosure.

Example 1

Testing Different Doping Proportions of Aniline (AN) and m-Aminobenzenesulfonic Acid (MSAN):

Dissolve AN and MSAN in DI water to a concentration of 0.057 M each, wherein the mole ratio of AN and MSAN is 1:4, 1:2, 1:1, or 4:1, and add a suitable amount of SEQ ID NO: 3 peptide to prepare a solution of 20 ml in total.

Add the solution to an electropolymerization pool and mix with a magnate, add platinum as the auxiliary electrode and Ag/AgCl as the reference electrode, connect to the screen-printed electrode (DropSens-250AT) as the working electrode. Connect it to a commercial potentiostat, and perform 20 cycles scanned from 0.6 V to –0.6 V at 0.1 V/s.

Immerse the finished peptide-imprinted conductive polymer in 5 wt % ethanol solution and DI water and place it on a shaker at 130 rpm for 5 minutes each. The procedure is used to remove the template molecule bound to the conductive polymer and leaves imprinted cavities with identifying ability.

Dissolve potassium chloride (KCl), potassium ferricyanide ($K_3[Fe(CN)_6]$), and potassium ferrocyanide ($K_4[Fe(CN)_6]$) in DI water to form a buffer solution. Starting with the buffer solution without the addition of the target molecule α-synuclein, wait for 10 minutes, and then obtain the cyclic voltammogram with a commercial potentiostat. Adsorb the measured solution with a filter paper, add drops of a solution containing 1~1000 pg/ml target molecule, and wait another 10 minutes before measurement. Combine the two sets of data to obtain the response current density value.

Figure 2:
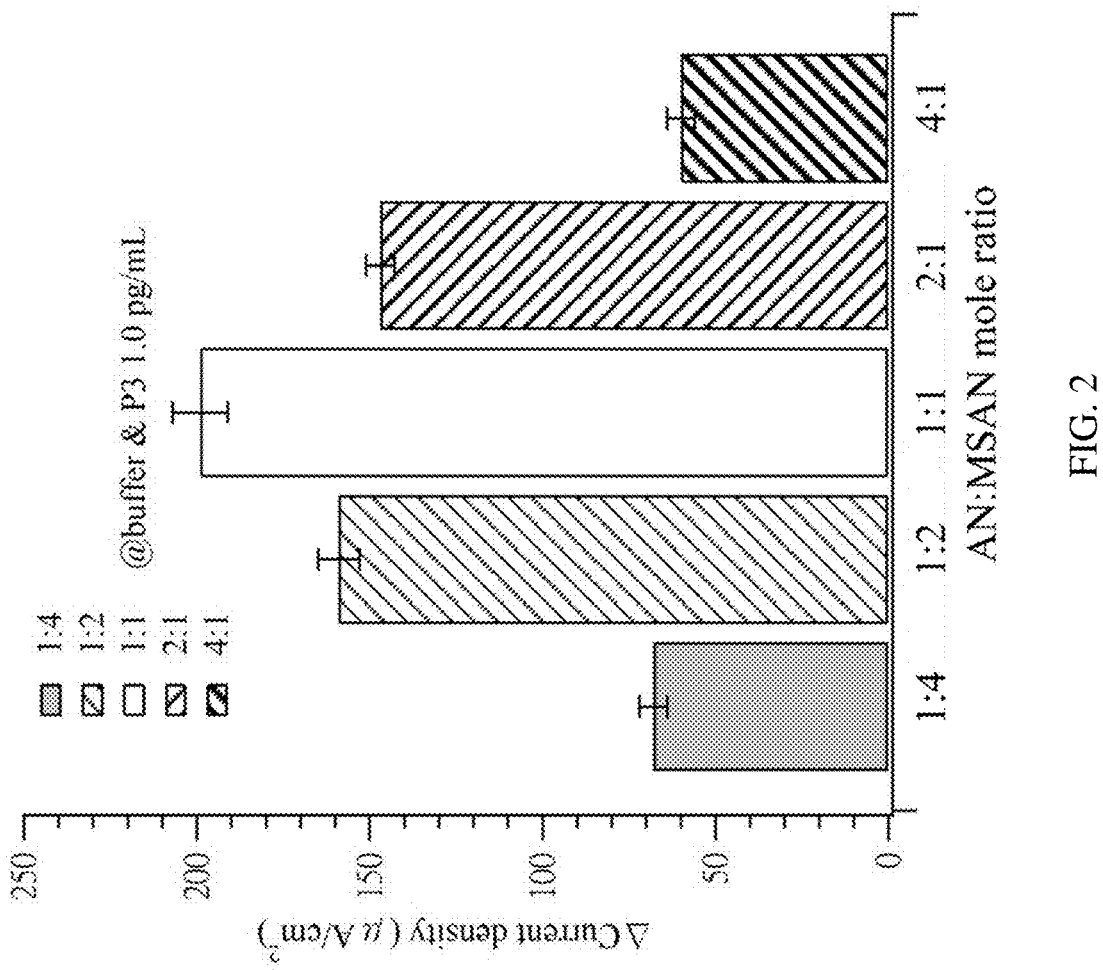
FIG. 2 shows the response current density values of different doping ratios of aniline (AN) and m-aminobenzenesulfonic acid (MSAN) of the present disclosure.
Figure 3:
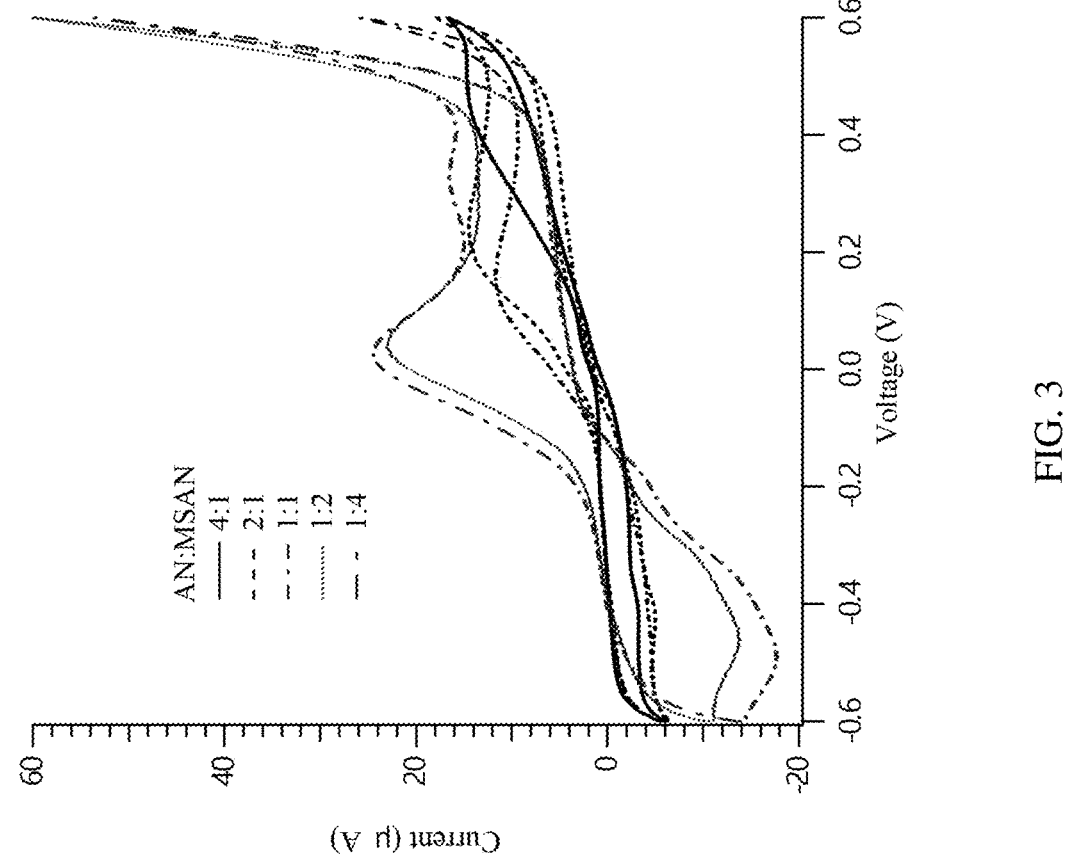
FIG. 3 shows the cyclic voltammograms of different doping ratios of aniline (AN) and m-aminobenzenesulfonic acid (MSAN) of the present disclosure.
Figure 4:
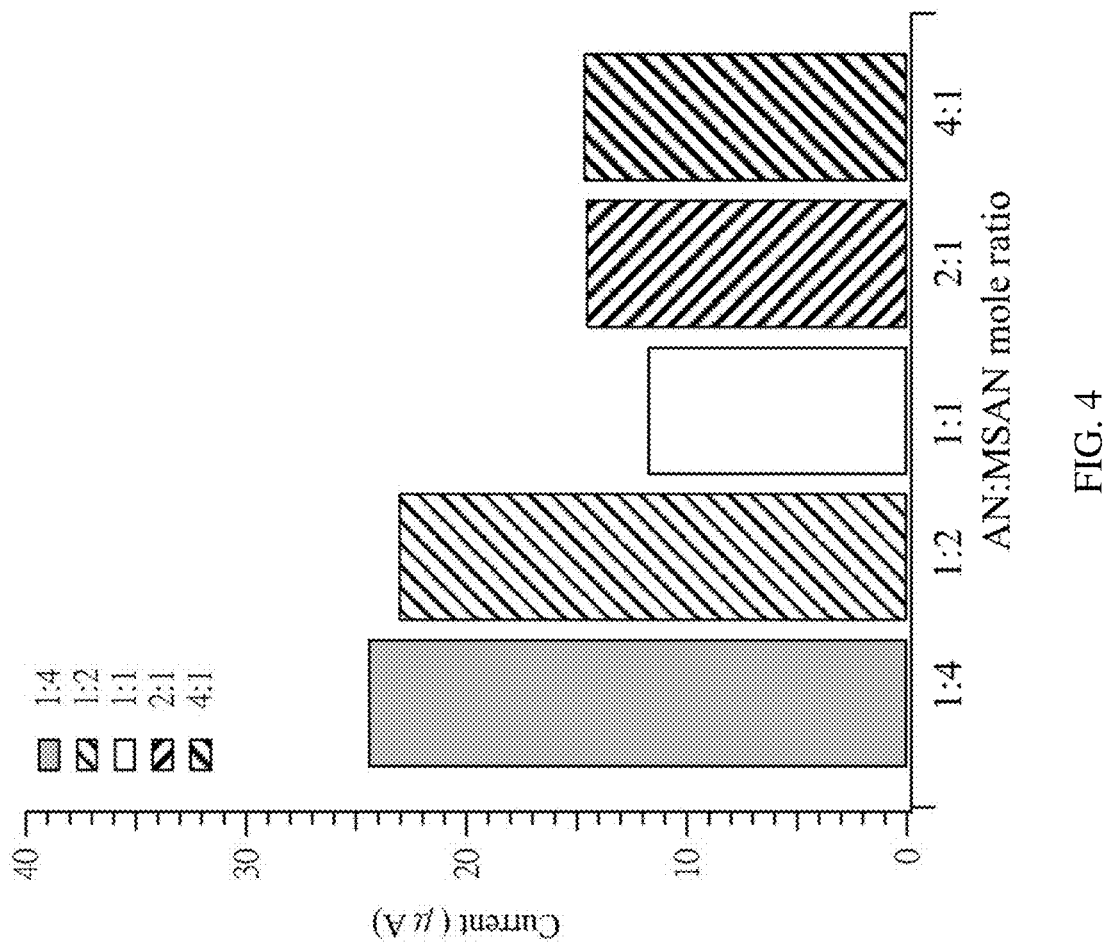
FIG. 4 shows the oxidization peak values of the cyclic voltammograms of different doping ratios of aniline (AN) and m-aminobenzenesulfonic acid (MSAN) of the present disclosure.

The results, as shown in FIG. 2, indicate that with SEQ ID NO: 3 peptide-imprinted conductive polymer, the response current density has a maximum value with an AN:MSAN doping proportion of 1:1. As shown in FIGS. 3 and 4, with AN:MSAN being 1:1, the oxidization peak value in the cyclic voltammogram is the lowest out of the five proportions. This shows that when imprinting molecules on the polymer thin film, the lower the current value of the oxidization peak, the more cavities will be produced and the higher the response current density value.

Example 2

Testing the Concentration of the Template Molecule Added:

Select the peptides SEQ ID NO: 2, SEQ ID NO: 3, and SEQ ID NO: 4, and add each peptide to a conductive polymer solution with an AN:MSAN ratio of 1 respectively to prepare three solutions. The three solutions are 20 ml each, and have a concentration of 0.1 wt %, 0.25 wt %, and 0.5 wt % respectively (i.e., adding 20 μl, 50 μl, and 100 μl of the peptide solution). Next, proceed with the electropolymerization and washing process based on the parameters in Example 1 to form the electrochemical biosensor of the peptide-imprinted conductive polymer.

Figure 5:
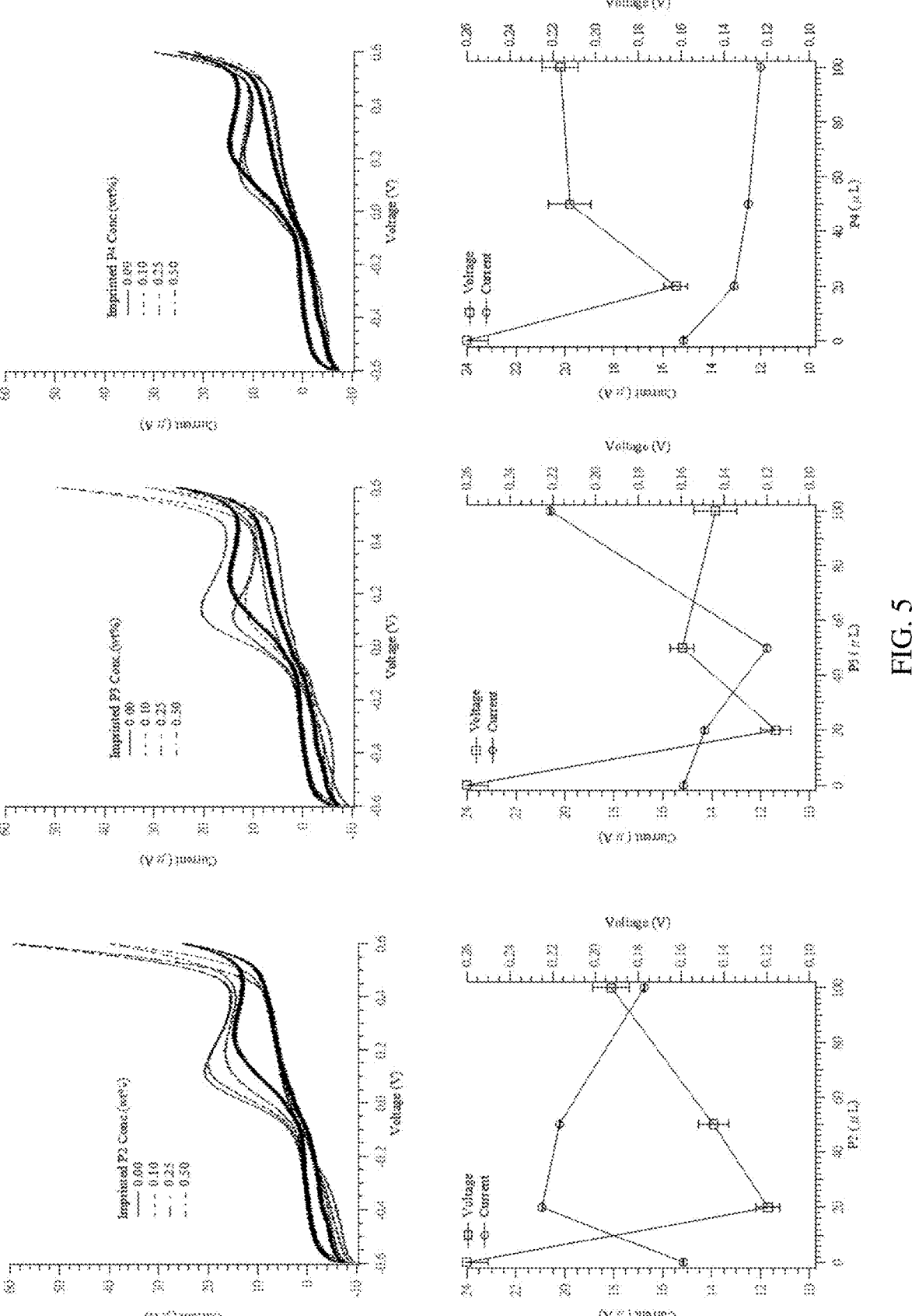
FIG. 5 shows the cyclic voltammograms of the template molecule of the present disclosure added in different concentrations.
Figure 6:
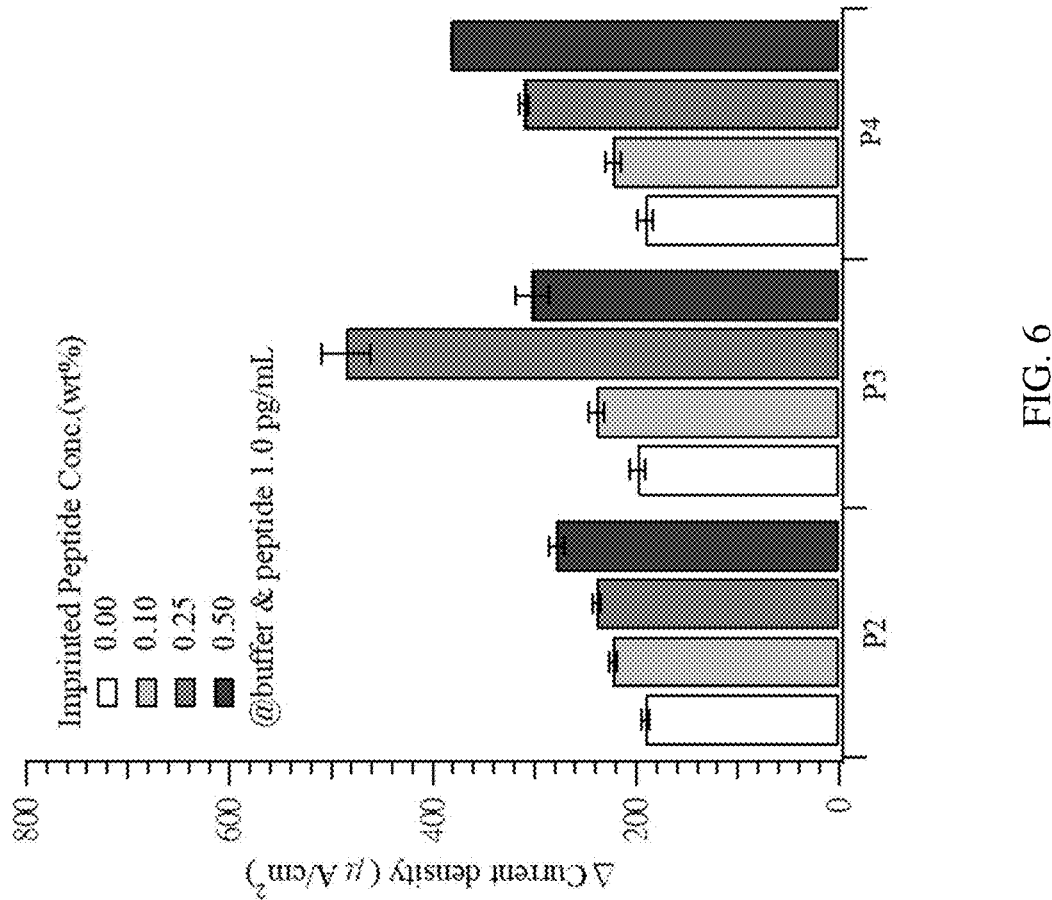
FIG. 6 shows the response current density values of the template molecule of the present disclosure added in different concentrations.

As shown in FIGS. 5 and 6, after dripping in 1 pg/ml of the target molecule solution, the results indicate that peptides SEQ ID NO: 2 and SEQ ID NO: 4 have a higher response current density value at 0.5 wt % compared to other concentrations, and peptide SEQ ID NO: 3 has the highest response current density value at 0.25 wt % compared to other peptides.

Figure 7:
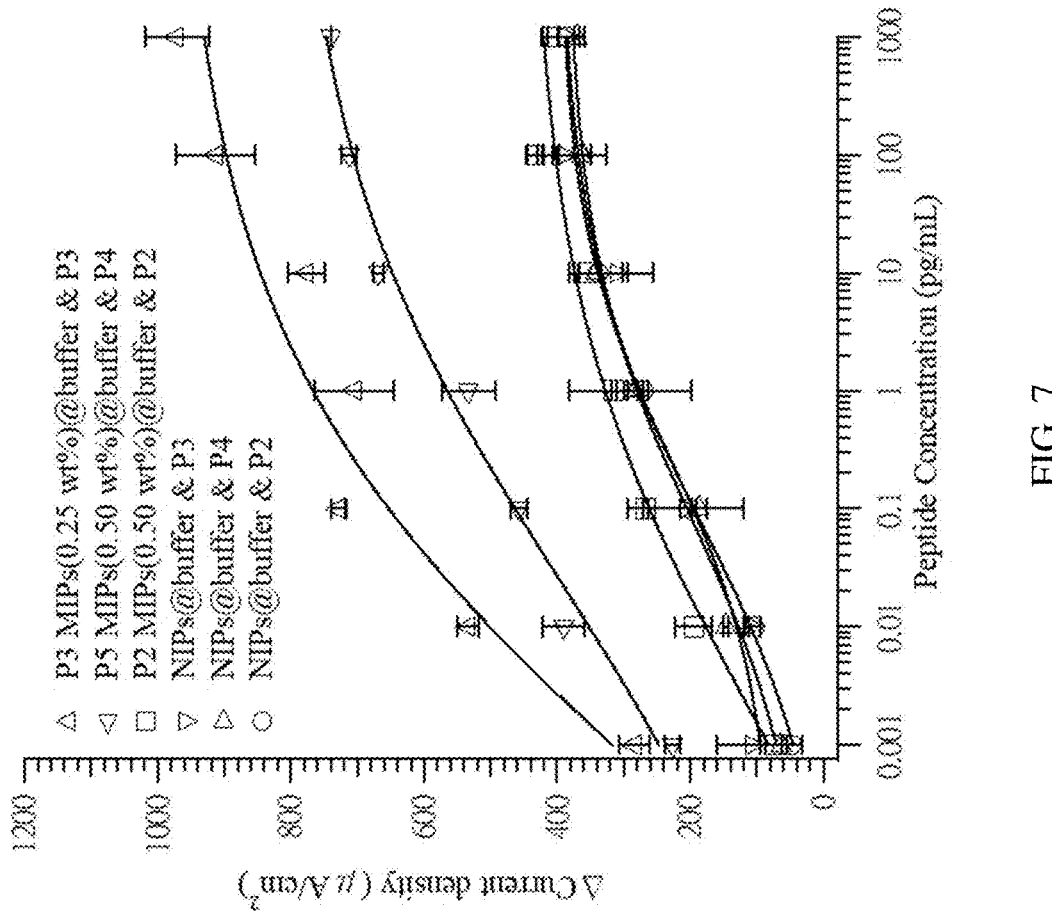
FIG. 7 shows the calibration curves of the present disclosure with or without addition of different template molecules.

As shown in FIG. 7 and Table 1, 0.5 wt % SEQ ID NO: 2, 0.25 wt % SEQ ID NO: 3 and 0.5 wt % SEQ ID NO: 4 are imprinted, and target molecule solutions of various concentrations are added (0.001 pg/ml to 1000 pg/ml) for testing. Compared with those imprinted with peptides SEQ ID NO: 2 and SEQ ID NO: 4, the results show that the conductive polymer with the peptide SEQ ID NO: 3 imprinted has the highest response current density value $971 \pm 47$ μA/cm$^2$, and excellent imprinting effectiveness (α) 2.52. Imprinting effectiveness (α)=MIPs current/NIPs current, wherein MIPs denote imprinted thin films, and NIPs denote non-imprinted thin films.

TABLE 1

| | MIPs | NIPs | Imprinting effectiveness α |
|---|---|---|---|
| 0.5 wt % SEQ ID NO: 2 | 410 ± 12 μA/cm$^2$ | 386 ± 28 μA/cm$^2$ | 1.1 |
| 0.25 wt % SEQ ID NO: 3 | 971 ± 47 μA/cm$^2$ | 386 ± 12 μA/cm$^2$ | 2.5 |
| 0.5 wt % SEQ ID NO: 4 | 740 μA/cm$^2$ | 370 ± 4 μA/cm$^2$ | 2.0 |

Example 3

Testing the Doping Effects of Transition Metal Sulfide 2D Materials and Sizes:

Prepare an electrochemical biosensor with non-imprinted polymer (NIP) as the control group, and prepare an electrochemical biosensor with 0.25 wt % SEQ ID NO: 3-imprinted conductive polymer (MIP) as the experimental group. Compare the results of using three kinds of commercially available 2D materials at different concentrations, namely 90 nm $WS_2$, 2 μm $WS_2$, and 2 μm $MoS_2$, as dopants. First, dissolve the three materials in DI water to prepare solutions of 0.1 wt %, 0.25 wt %, and 0.5 wt % respectively (i.e., adding 20 μl, 50 μl, and 100 μl of the materials). Add the solutions to the electropolymerization pool to evenly mix with the conductive monomer solution and the template molecule. The electropolymerization, washing process and parameters remain the same as Example 1. Starting with the buffer solution without the addition of α-synuclein, wait for 10 minutes, and then obtain the cyclic voltammogram with a commercial potentiostat. Adsorb the measured solution with a filter paper, add drops of a solution containing 1 pg/ml α-synuclein, and wait another 10 minutes before measurement.

Figure 8:
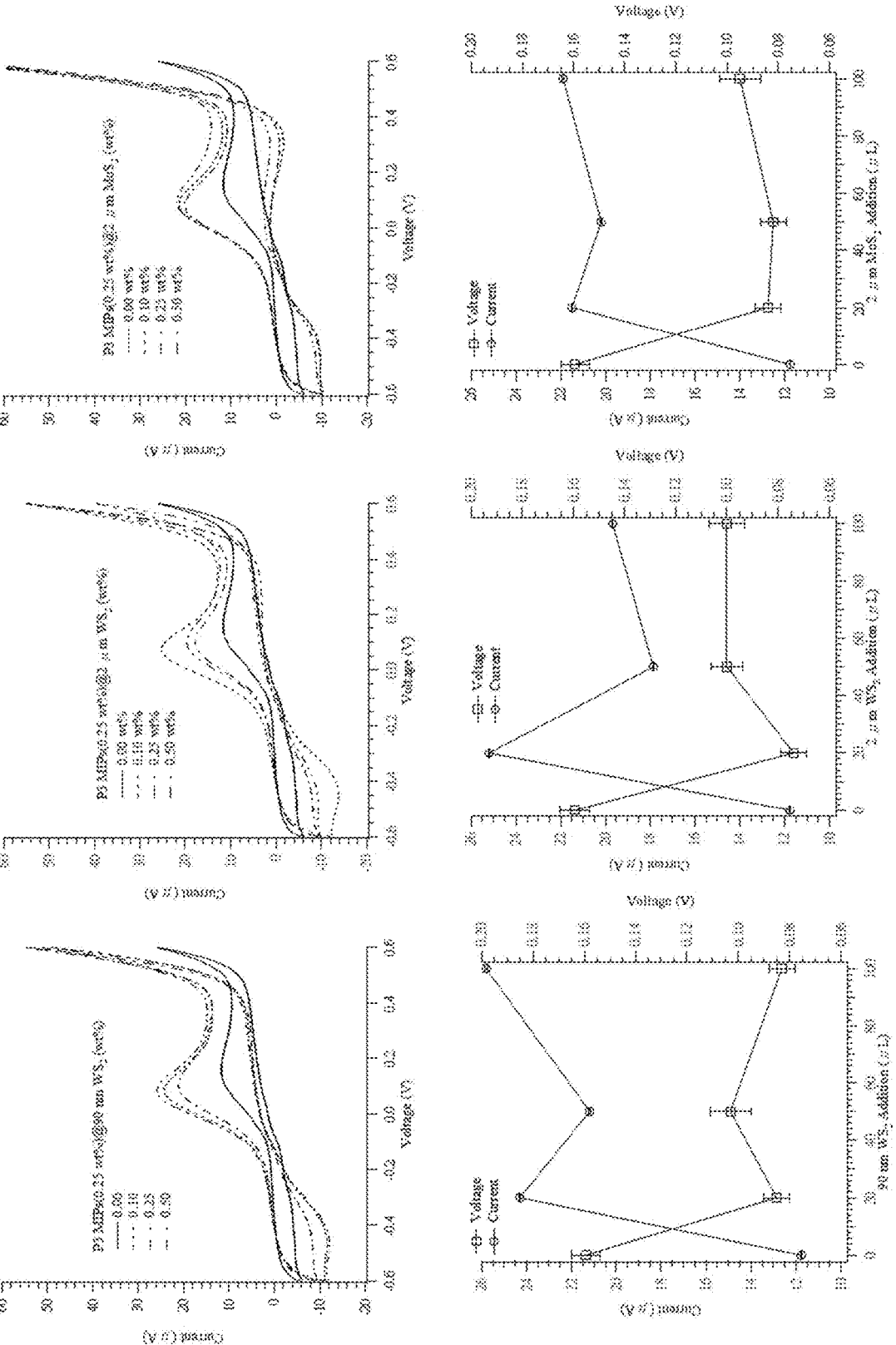
FIG. 8 shows the cyclic voltammograms of the effects of the present disclosure with the doping of different-sized transition metal sulfide 2D materials.
Figure 9:
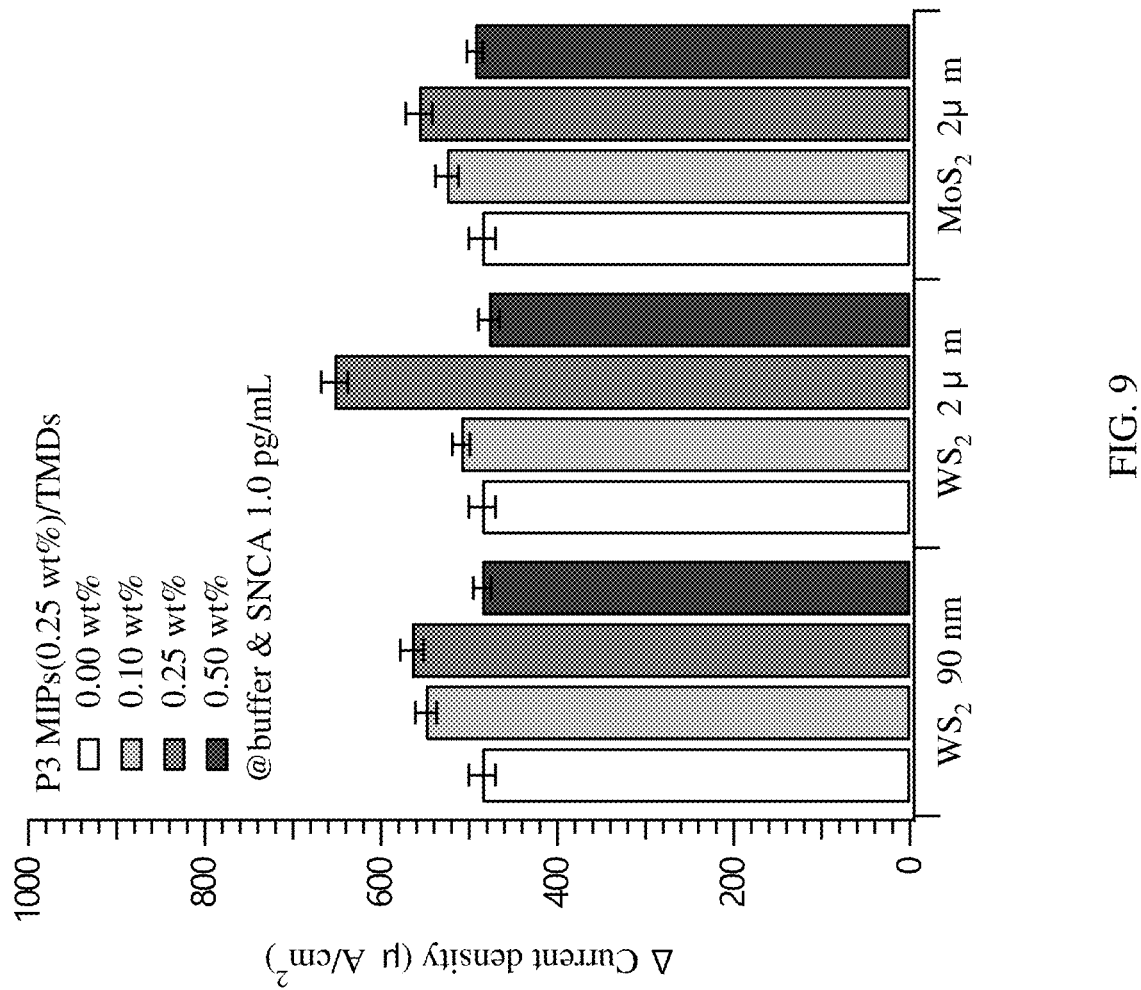
FIG. 9 shows the response current density values of the effects of the present disclosure with the doping of different-sized transition metal sulfide 2D materials.

As shown in FIGS. 8 and 9, the response current density value with the addition of 0.25 wt % transition metal sulfide 2D materials is higher than other concentrations, and the oxidization peak values in the cyclic voltammograms are the lowest among the three concentrations. The addition of 0.25 wt % 2 μm $WS_2$ results in the highest response current density value and the lowest oxidization peak value compared with the other 2D materials.

Example 4

Testing the Doping Effects of Transition Metal Sulfide 2D Materials:

Prepare an electrochemical biosensor with non-imprinted polymer (NIP) as the control group, and prepare an electrochemical biosensor with 0.25 wt % SEQ ID NO: 3-imprinted conductive polymer (MIP) as the experimental group. Use the commercially available 2 μm $WS_2$ as the doping agent, and compare whether its addition improves the biosensor and the imprinting effectiveness. First, dissolve 0.25 wt % 2 μm $WS_2$ in DI water, and add it to the electropolymerization pool to evenly mix with the conductive monomer solution and the template molecule. The electropolymerization, washing process and parameters remain the same as Example 1. Starting with the buffer solution without the addition of α-synuclein, wait for 10 minutes, and then obtain the cyclic voltammogram with a commercial potentiostat. Adsorb the measured solution with a filter paper, and take the α-synuclein solutions with low to high concentrations. Add drops of each solution and wait another 10 minutes before measurement. Combine the multiple sets of data to obtain the calibration line for the adsorption of α-synuclein.

Figure 10:
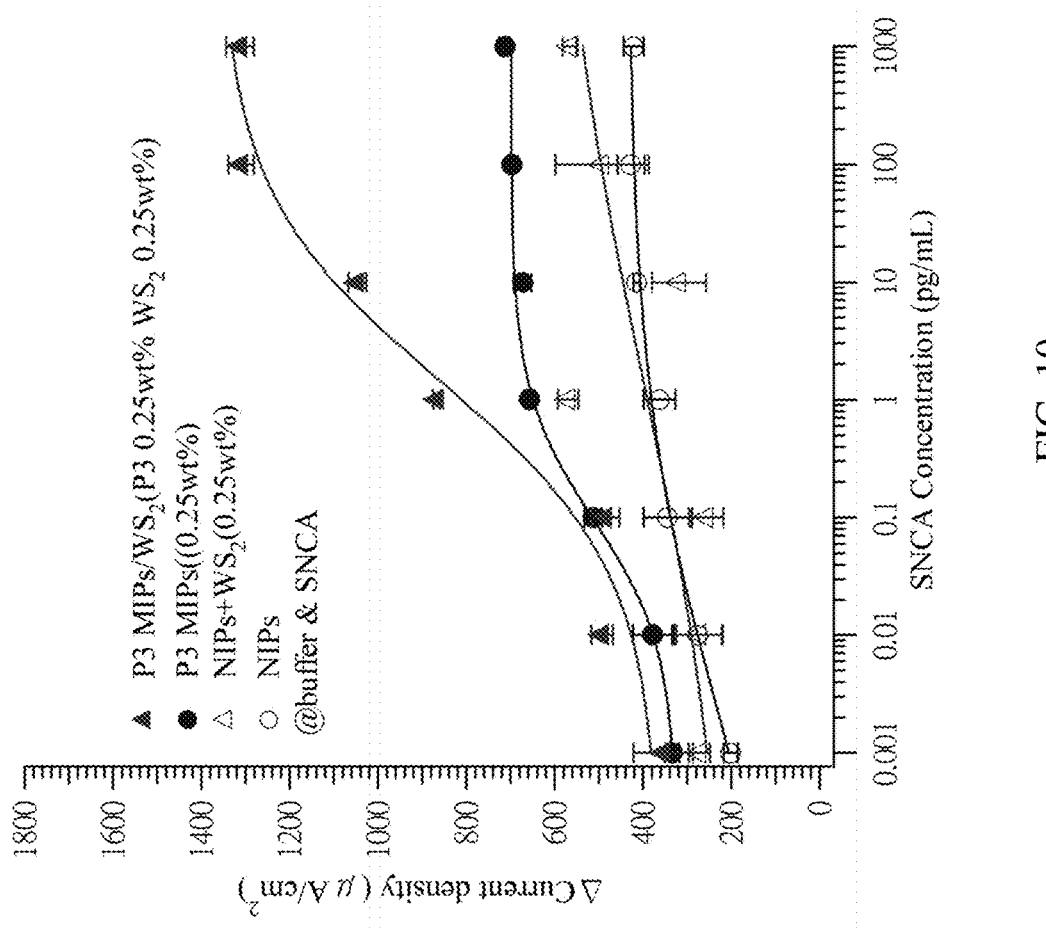
FIG. 10 shows the test results of the effectiveness of doping with transition metal sulfide 2D materials.

As shown in FIG. 10 and Table 2, with the adsorption of 100 pg/ml α-synuclein, the peptide SEQ ID NO: 3 MIP/$WS_2$ biosensor has the response current density value of 1309±28 $\mu A/cm^2$, which is significantly higher than the response current density value 712±12 $\mu A/cm^2$ of that without the $WS_2$ thin film. The biosensor with $WS_2$ also exhibits a 1.6 times improvement in imprinting effectiveness. Imprinting effectiveness (α)=MIPs current/NIPs current, wherein MIPs denote imprinted thin films, and NIPs denote non-imprinted thin films.

TABLE 2

| | MIPs | NIPs | Imprinting effectiveness α |
|---|---|---|---|
| 0.25 wt % SEQ ID NO: 3 0.25 wt % 2 μm $WS_2$ | 1309 ± 28 $\mu A/cm^2$ | 494 ± 106 $\mu A/cm^2$ | 2.7 |
| 0.25 wt % SEQ ID NO: 3 | 712 ± 12 $\mu A/cm^2$ | 422 ± 23 $\mu A/cm^2$ | 1.7 |

Figure 11:
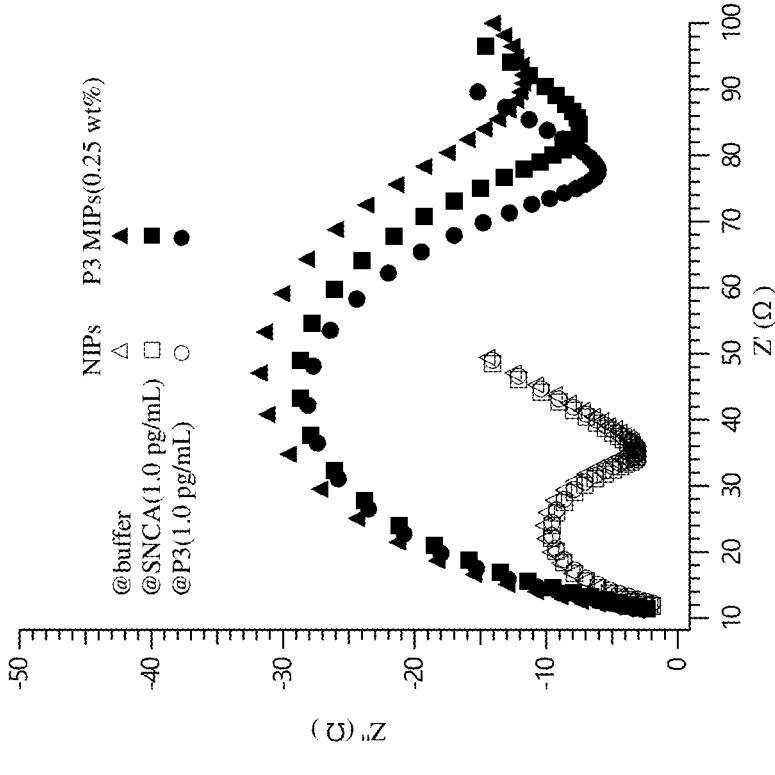
FIG. 11 shows the electrochemical impedance measurements of the present disclosure.
Figure 11:
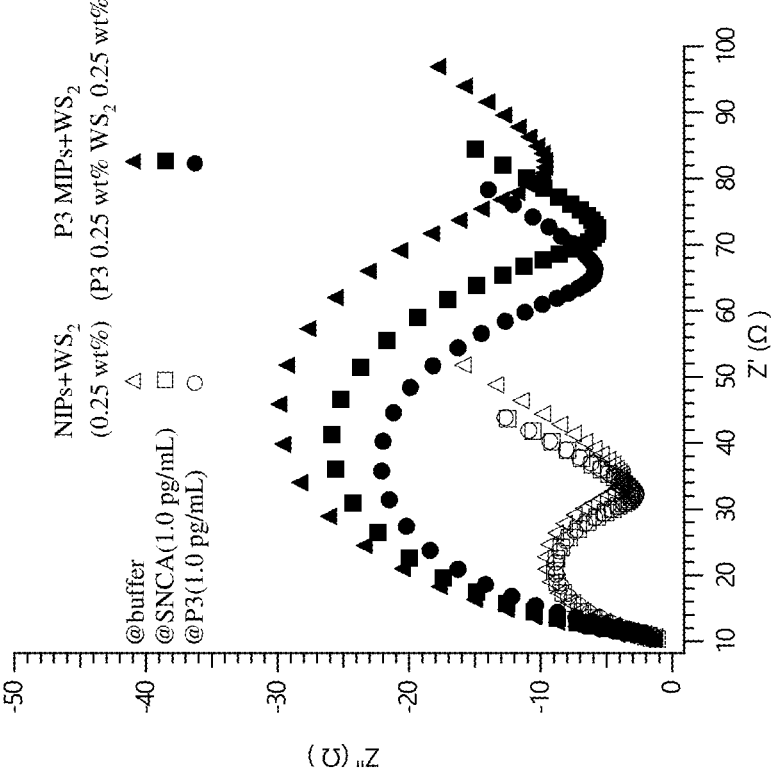

Electrochemical impedance analysis further confirms that, as shown in FIG. 11, after the addition of the 2 μm $WS_2$ 2D material, the electrochemical biosensor of the peptide SEQ ID NO: 3—imprinted conductive polymer has a decreased Rct value, corresponding to the increase in response current density value after adding the 2 μm $WS_2$. The non-peptide-imprinted thin film shows no significant difference in Rct value before and after the addition of 2 μm $WS_2$.

Example 5

Figure 12:
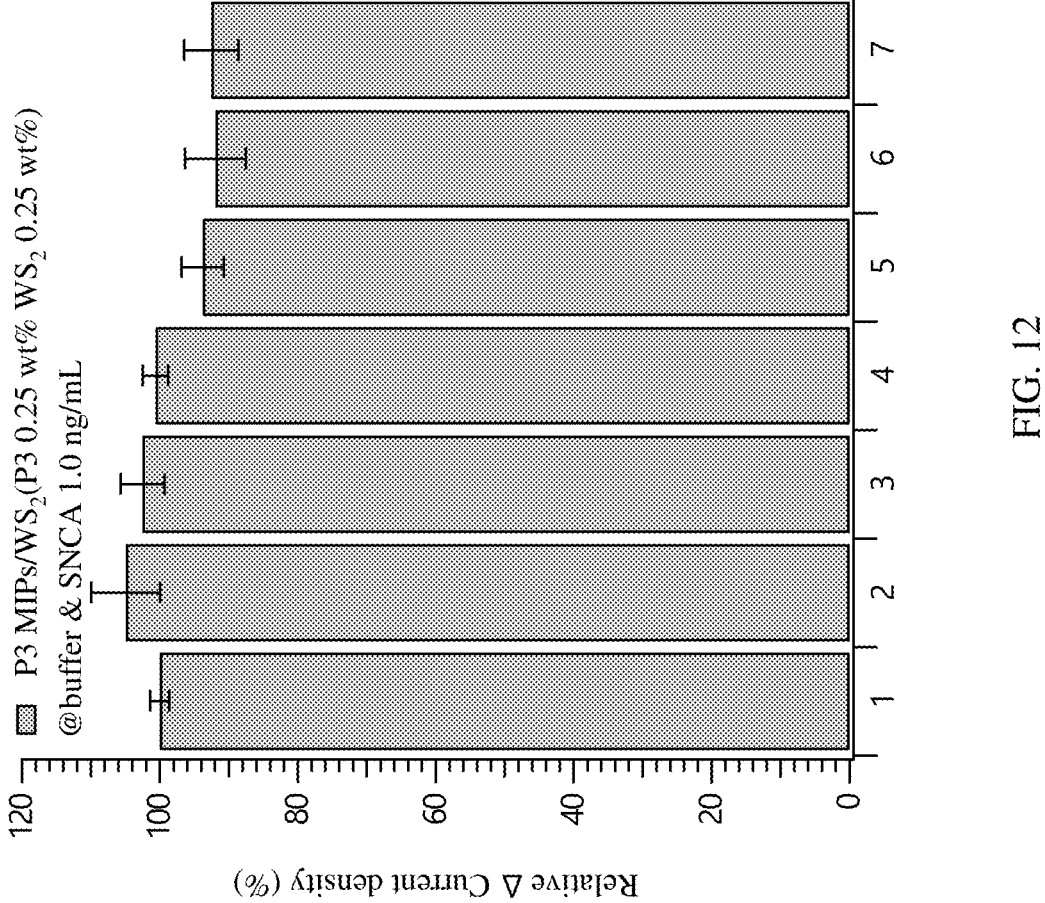
FIG. 12 shows the tests on reusability of the present disclosure.

Reusability Test:

Prepare an electrochemical biosensor with α-synuclein peptide-imprinted conductive polymer with the same steps as Example 1. The molecular ratio of AN:MSAN is 1:1, 0.25 wt % peptide SEQ ID NO: 3 template molecule is imprinted, and 0.25 wt % 2 μm $WS_2$2D material is added. Wash and remove the target molecule (α-synuclein) bound to the cavities with the washing procedure in Example 1. Reuse the same testing solution, and repeat multiple times until the electrode exhibits clear decline in performance in order to test its reusability. As shown in FIG. 12, after 7 consecutive adsorption and desorption, the relative response current density shows an 8% decline in the electrode's performance, which indicates an excellent reusability of the biosensor.

What is claimed is:

1. A peptide-imprinted conductive polymer comprising: one or more conductive polymer monomers, an α-synuclein identifying template molecule, and one or more two-dimensional (2D) materials, wherein the one or more two-dimensional materials is at least one substance selected from the group having a structural formula $M_{n+1}AX_n$ or $MY_2$, wherein M denotes a transition metal element, A denotes an element from group IIIA or IVA, X denotes carbon or nitrogen, Y denotes chalcogen element, and n=1-3.

2. The peptide-imprinted conductive polymer of claim 1, wherein the one or more conductive polymer monomers is at least one substance selected from the group consisting of aniline (AN), m-aminobenzenesulfonic acid (MSAN), 3,4-ethylenedioxythiophene (EDOT), and hydroxymethyl 3,4-ethylenedioxy-thiophene (EDOT-OH).

3. The peptide-imprinted conductive polymer of claim 1, wherein the concentration of the one or more conductive polymer monomers is 0.001 to 50 wt %.

4. The peptide-imprinted conductive polymer of claim 1, wherein the α-synuclein identifying template molecule is selected from peptide fragments in SEQ ID NO: 1 fulfilling the following conditions:

i. the peptide fragments are 6 to 22 amino acids in length;
   ii. the peptide fragments contain 1 to 9 hydrophobic amino acids; and
   iii. the peptide fragments contain 1 to 4 aromatic amino acids.

5. The peptide-imprinted conductive polymer of claim 1, wherein the concentration of the α-synuclein identifying template molecule is 0.001 to 50 wt %.

6. The peptide-imprinted conductive polymer of claim 1, wherein the one or more 2D materials is at least one substance selected from the group consisting of $Cr_2AlC$, $Mn_2AlC$, $Mo_2Ga_2C$, $Mo_3AlC_2$, $Nb_2AlC$, $Nb_2C$, $Nb_4AlC_3$, $Ta_4AlC_3$, $Ti_2AlC$, $Ti_2AlN$, $Ti_2C$, $Ti_3AlC_2$, $Ti_3C_2$, $Ti_3SiC_2$, $V_2AlC$, $V_2C$, $V_4AlC_3$, $MoS_2$, $WS_2$, $TiS_2$, $VS_2$, $CoS_2$, $NiS_2$, $ZrS_2$, $TcS_2$, $RhS_2$, $PdS_2$, $HfS_2$, $TaS_2$, $ReS_2$, $IrS_2$, $InS_2$, $SnS_2$, $S_2PtS_2$, $MoSe_2$, $WSe_2$, $TiSe_2$, $VSe_2$, $CoSe_2$, $NiSe_2$, $ZrSe_2$, $TcSe_2$, $RhSe_2$, $PdSe_2$, $HfSe_2$, $TaSe_2$, $ReSe_2$, $IrSe_2$, $InSe_2$, $SnSe_2$, $Se_2$, $PtSe_2$, $MoTe_2$, $WTe_2$, $TiTe_2$, $VTe_2$, $CoTe_2$, $NiTe_2$, $ZrTe_2$, $TcTe_2$, $RhTe_2$, $PdTe_2$, $HfTe_2$, $TaTe_2$, $ReTe_2$, $IrTe_2$, $InTe_2$, $SnTe_2$, $Te_2$, and $PtTe_2$.

7. An electrochemical biosensor comprising: the peptide-imprinted conductive polymer of claim 1 and an electrode substrate.

8. A method of preparing the electrochemical biosensor of claim 7 comprising:

preparing an electrode substrate;
   preparing a monomer solution with conductive polymers with a concentration of 0.001 to 50 wt %, wherein the conductive polymer monomer(s) is at least one substance selected from the group consisting of aniline (AN), m-aminobenzenesulfonic acid (MSAN), 3,4-ethylenedioxythiophene (EDOT), and hydroxymethyl 3,4-ethylenedioxy-thiophene (EDOT-OH);
   adding a template molecule with a concentration of 0.001 to 50 wt % to the monomer solution and mix; and
   adding a 2D material solution, causing the resulting solution to electrochemically polymerize at the electrode substrate.

9. A method of detecting the concentration of α-synuclein in a sample comprising:

dropping standard solutions containing different concentrations of α-synuclein on a biosensor of the peptide-imprinted conductive polymer of claim 1, and obtain the response current density volume of the cyclic voltammograms of the standard solutions containing different concentrations of α-synuclein with a potentiostat, and repeat measurement at least twice;
   obtaining the calibration curve of α-synuclein with the response current density value of the cyclic voltammograms of the standard solutions containing different concentrations of α-synuclein;

dropping the sample solution on the biosensor and measure its response current density value of the cyclic voltammogram, and repeat measurement at least twice; and comparing the response current density value of the sample with the calibration curve of α-synuclein and obtain the concentration of α-synuclein in the sample.

\* \* \* \* \*

SEQUENCE LISTING

<160> NUMBER OF SEQ ID NOS: 14

<210> SEQ ID NO 1
<211> LENGTH: 140
<212> TYPE: PRT
<213> ORGANISM: Homo sapiens

<400> SEQUENCE: 1

Met Asp Val Phe Met Lys Gly Leu Ser Lys Ala Lys Glu Gly Val Val
1               5                   10                  15

Ala Ala Ala Glu Lys Thr Lys Gln Gly Val Ala Glu Ala Ala Gly Lys
            20                  25                  30

Thr Lys Glu Gly Val Leu Tyr Val Gly Ser Lys Thr Lys Glu Gly Val
        35                  40                  45

Val His Gly Val Ala Thr Val Ala Glu Lys Thr Lys Glu Gln Val Thr
    50                  55                  60

Asn Val Gly Gly Ala Val Val Thr Gly Val Thr Ala Val Ala Gln Lys
65                  70                  75                  80

```
Thr Val Glu Gly Ala Gly Ser Ile Ala Ala Ala Thr Gly Phe Val Lys
            85                  90                  95

Lys Asp Gln Leu Gly Lys Asn Glu Glu Gly Ala Pro Gln Glu Gly Ile
            100                 105                 110

Leu Glu Asp Met Pro Val Asp Pro Asp Asn Glu Ala Tyr Glu Met Pro
        115                 120                 125

Ser Glu Glu Gly Tyr Gln Asp Tyr Glu Pro Glu Ala
    130                 135                 140

<210> SEQ ID NO 2
<211> LENGTH: 14
<212> TYPE: PRT
<213> ORGANISM: Artificial Sequence
<220> FEATURE:
<223> OTHER INFORMATION: a-Synuclein synthetic peptide on sites 1-14

<400> SEQUENCE: 2

Met Asp Val Phe Met Lys Gly Leu Ser Lys Ala Lys Glu Gly
1               5                   10

<210> SEQ ID NO 3
<211> LENGTH: 13
<212> TYPE: PRT
<213> ORGANISM: Artificial Sequence
<220> FEATURE:
<223> OTHER INFORMATION: a-Synuclein synthetic peptide on sites 27-39

<400> SEQUENCE: 3

Ala Glu Ala Ala Gly Lys Thr Lys Glu Gly Val Leu Tyr
1               5                   10

<210> SEQ ID NO 4
<211> LENGTH: 15
<212> TYPE: PRT
<213> ORGANISM: Artificial Sequence
<220> FEATURE:
<223> OTHER INFORMATION: a-Synuclein synthetic peptide on sites 39-53

<400> SEQUENCE: 4

Tyr Val Gly Ser Lys Thr Lys Glu Gly Val Val His Gly Val Ala
1               5                   10                  15

<210> SEQ ID NO 5
<211> LENGTH: 18
<212> TYPE: PRT
<213> ORGANISM: Artificial Sequence
<220> FEATURE:
<223> OTHER INFORMATION: a-Synuclein synthetic peptide on sites 35-52

<400> SEQUENCE: 5

Glu Gly Val Leu Tyr Val Gly Ser Lys Thr Lys Glu Gly Val Val His
1               5                   10                  15

Gly Val

<210> SEQ ID NO 6
<211> LENGTH: 14
<212> TYPE: PRT
<213> ORGANISM: Artificial Sequence
<220> FEATURE:
<223> OTHER INFORMATION: a-Synuclein synthetic peptide on sites 3-16

<400> SEQUENCE: 6

Val Phe Met Lys Gly Leu Ser Lys Ala Lys Glu Gly Val Val
1               5                   10
```

-continued

```
<210> SEQ ID NO 7
<211> LENGTH: 12
<212> TYPE: PRT
<213> ORGANISM: Artificial Sequence
<220> FEATURE:
<223> OTHER INFORMATION: a-Synuclein synthetic peptide on sites 83-94

<400> SEQUENCE: 7

Glu Gly Ala Gly Ser Ile Ala Ala Ala Thr Gly Phe
1               5                   10

<210> SEQ ID NO 8
<211> LENGTH: 15
<212> TYPE: PRT
<213> ORGANISM: Artificial Sequence
<220> FEATURE:
<223> OTHER INFORMATION: a-Synuclein synthetic peptide on sites 87-101

<400> SEQUENCE: 8

Ser Ile Ala Ala Ala Thr Gly Phe Val Lys Lys Asp Gln Leu Gly
1               5                   10                  15

<210> SEQ ID NO 9
<211> LENGTH: 17
<212> TYPE: PRT
<213> ORGANISM: Artificial Sequence
<220> FEATURE:
<223> OTHER INFORMATION: a-Synuclein synthetic peptide on sites 93-109

<400> SEQUENCE: 9

Gly Phe Val Lys Lys Asp Gln Leu Gly Lys Asn Glu Glu Gly Ala Pro
1               5                   10                  15

Gln

<210> SEQ ID NO 10
<211> LENGTH: 14
<212> TYPE: PRT
<213> ORGANISM: Artificial Sequence
<220> FEATURE:
<223> OTHER INFORMATION: a-Synuclein synthetic peptide on sites 124-137

<400> SEQUENCE: 10

Ala Tyr Glu Met Pro Ser Glu Glu Gly Tyr Gln Asp Tyr Glu
1               5                   10

<210> SEQ ID NO 11
<211> LENGTH: 18
<212> TYPE: PRT
<213> ORGANISM: Artificial Sequence
<220> FEATURE:
<223> OTHER INFORMATION: a-Synuclein synthetic peptide on sites 117-131

<400> SEQUENCE: 11

Pro Val Asp Pro Asp Asn Glu Ala Tyr Glu Met Pro Ser Glu Glu Gly
1               5                   10                  15

Tyr Gln

<210> SEQ ID NO 12
<211> LENGTH: 16
<212> TYPE: PRT
<213> ORGANISM: Artificial Sequence
<220> FEATURE:
<223> OTHER INFORMATION: a-Synuclein synthetic peptide on sites 116-131

<400> SEQUENCE: 12
```

-continued

```
Met Pro Val Asp Pro Asp Asn Glu Ala Tyr Glu Met Pro Ser Glu Glu
1               5                   10                  15

<210> SEQ ID NO 13
<211> LENGTH: 14
<212> TYPE: PRT
<213> ORGANISM: Artificial Sequence
<220> FEATURE:
<223> OTHER INFORMATION: a-Synuclein synthetic peptide on sites 127-140

<400> SEQUENCE: 13

Met Pro Ser Glu Glu Gly Tyr Gln Asp Tyr Glu Pro Glu Ala
1               5                   10

<210> SEQ ID NO 14
<211> LENGTH: 17
<212> TYPE: PRT
<213> ORGANISM: Artificial Sequence
<220> FEATURE:
<223> OTHER INFORMATION: a-Synuclein synthetic peptide on sites 91-107

<400> SEQUENCE: 14

Ala Thr Gly Phe Val Lys Lys Asp Gln Leu Gly Lys Asn Glu Glu Gly
1               5                   10                  15

Ala
```